Feb. 21, 1956 L. M. BRYNGELSON 2,735,695
BILLING BOOK
Filed July 3, 1953 6 Sheets-Sheet 1

INVENTOR
LYLE M. BRYNGELSON,
BY Bailey, Stephens & Huettig
ATTORNEYS

Feb. 21, 1956      L. M. BRYNGELSON      2,735,695
BILLING BOOK

Filed July 3, 1953      6 Sheets-Sheet 2

Fig. 2.

INVENTOR
LYLE M. BRYNGELSON,
BY Bailey, Stephens & Huettig
ATTORNEYS

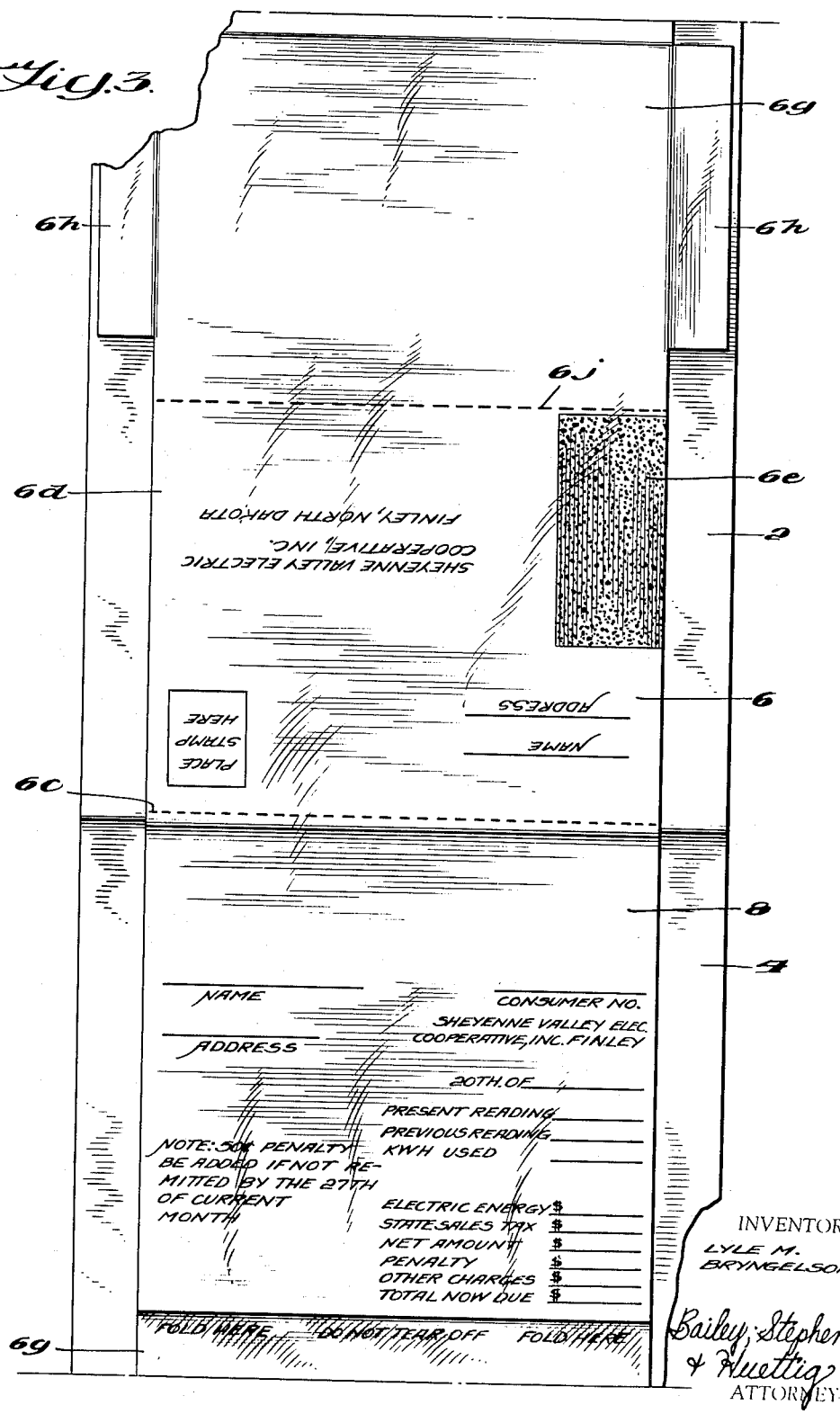

Feb. 21, 1956 L. M. BRYNGELSON 2,735,695
BILLING BOOK
Filed July 3, 1953 6 Sheets-Sheet 4
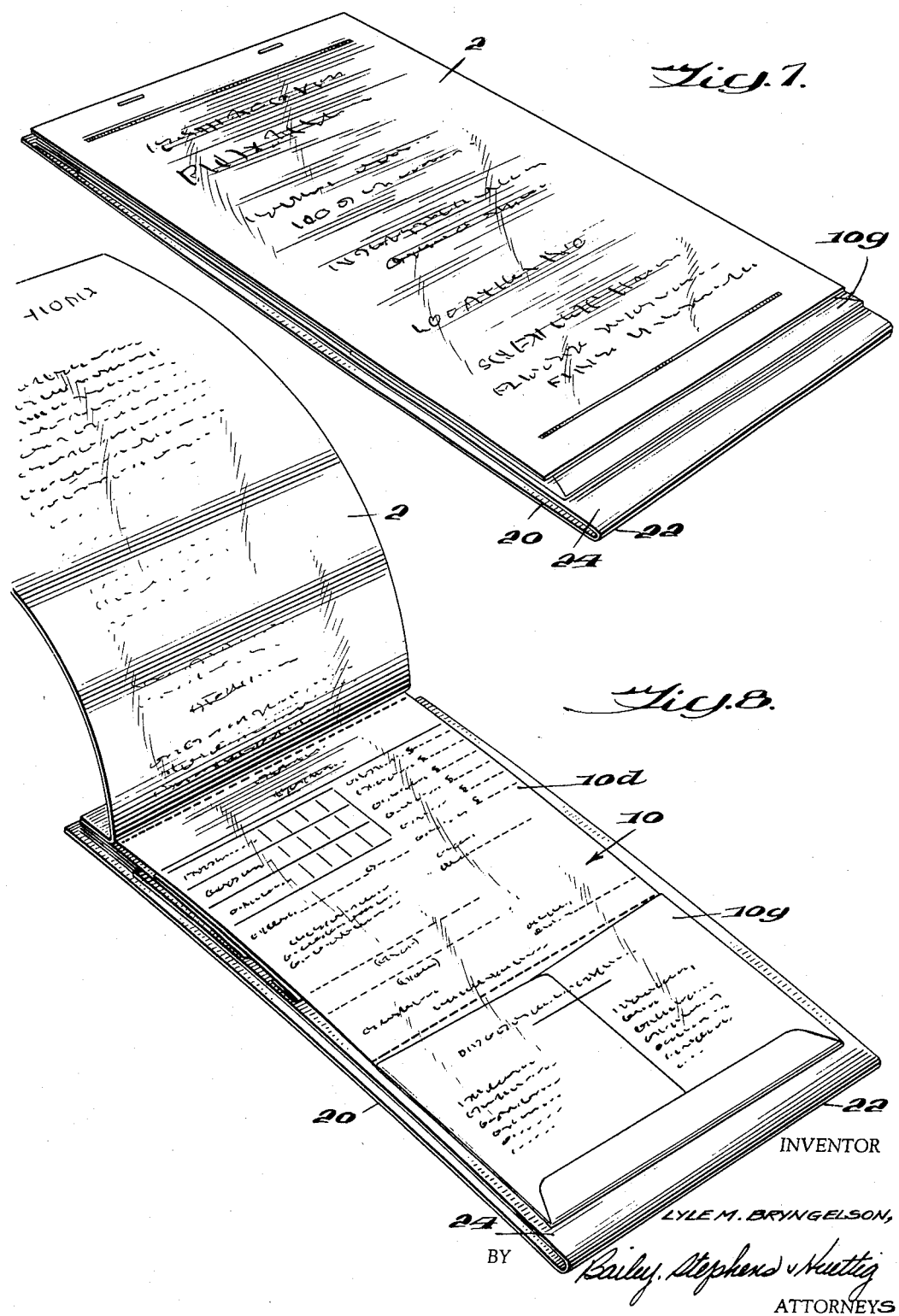
INVENTOR
LYLE M. BRYNGELSON,
BY
ATTORNEYS

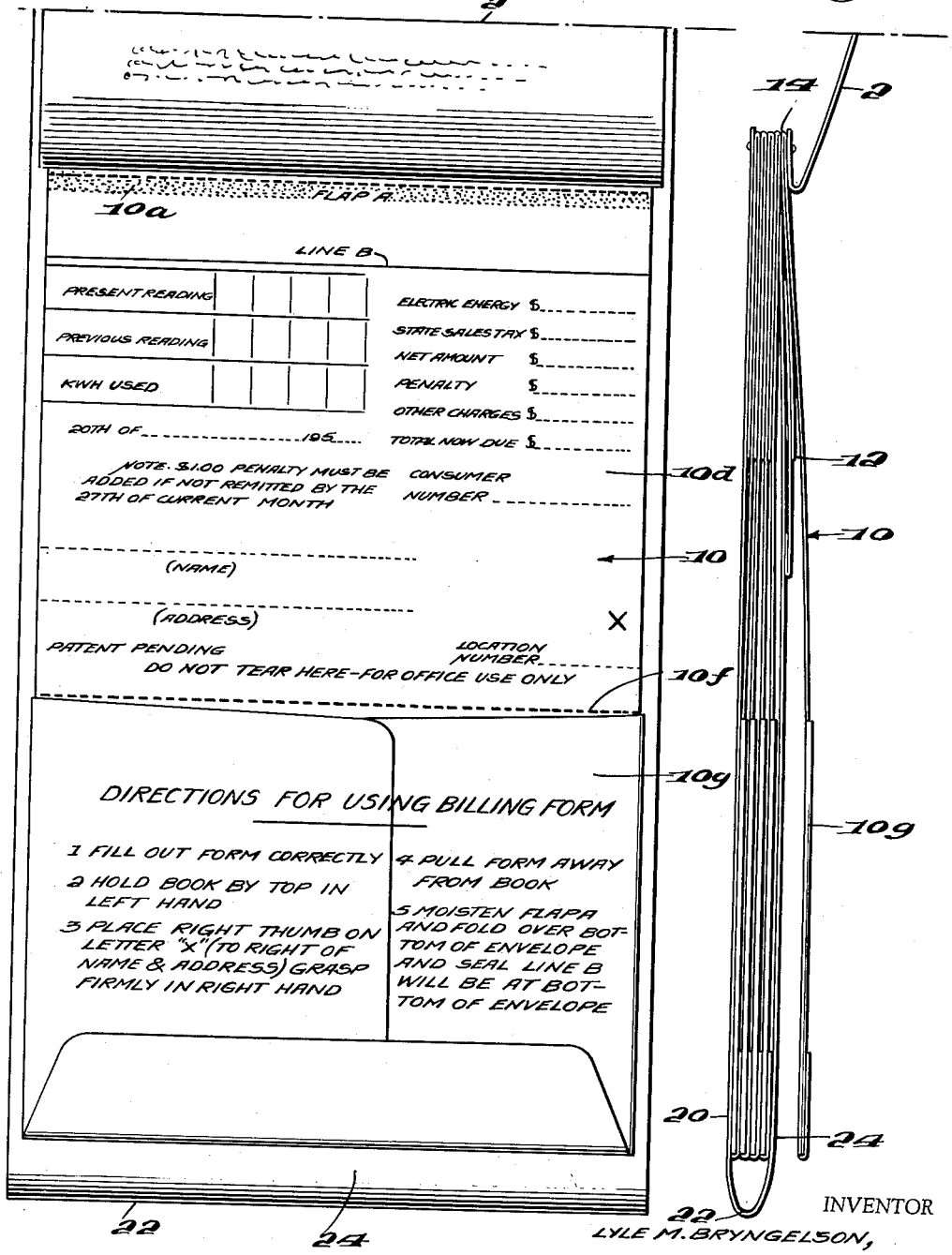

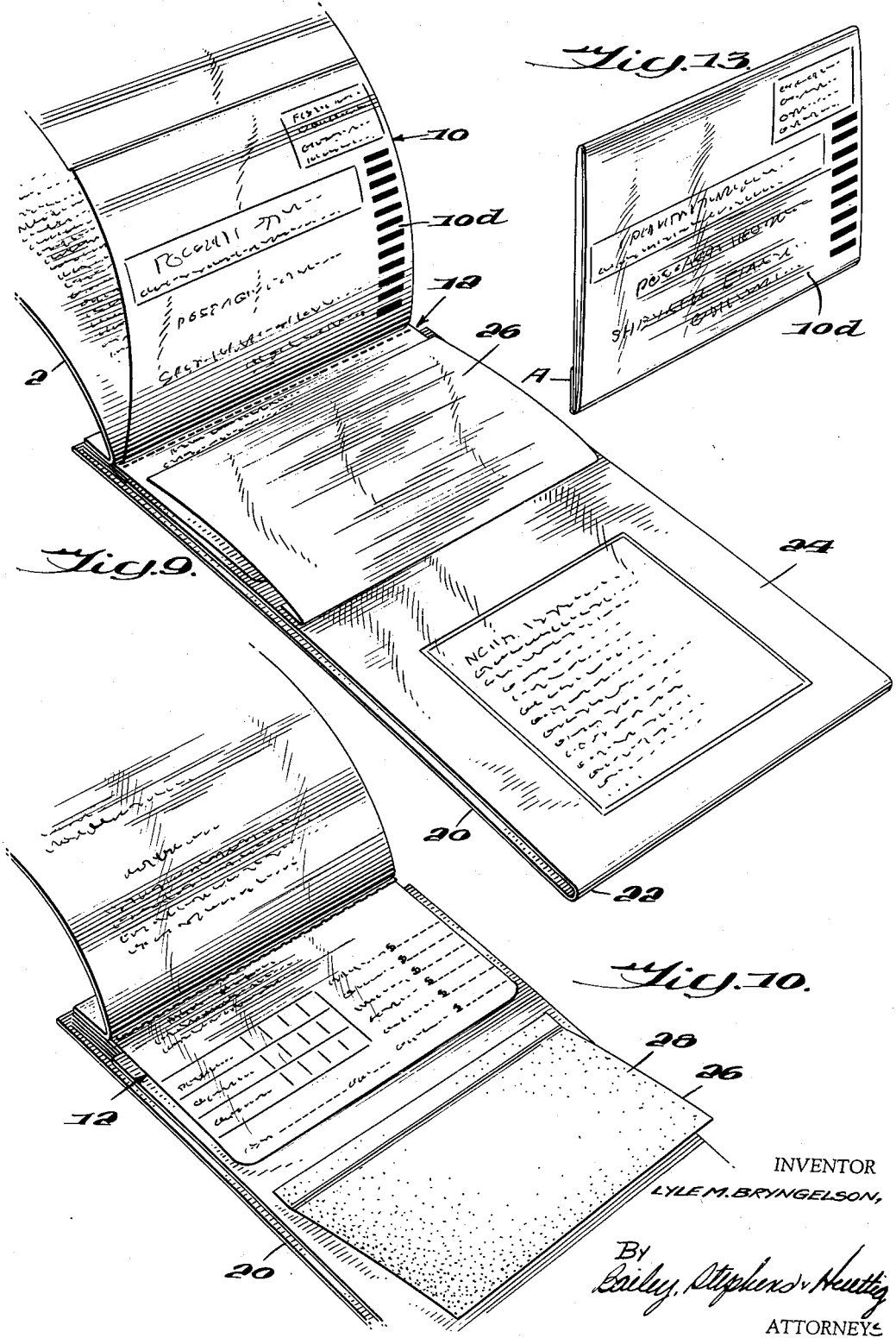

United States Patent Office 2,735,695
Patented Feb. 21, 1956

2,735,695

BILLING BOOK

Lyle M. Bryngelson, Finley, N. Dak.

Application July 3, 1953, Serial No. 365,915

5 Claims. (Cl. 282—23)

This invention relates to a billing and recording book. In particular the invention is directed to the construction of a book which is composed of removable self-billing slip and envelope pages, and record pages.

This application is a continuation-in-part of my application Serial No. 286,169, filed May 5, 1952, for "Billing Book," now abandoned.

Pre-addressed return envelopes and receipt systems are well known in making bank deposits. These envelopes are especially constructed for the accounting system employed. Likewise, other businesses have specially developed envelope forms for use in making remittances.

No known forms are adaptable for the use in rural electrical cooperative systems. In these systems the consumer reads his own meter in order that the high cost of having a meter reader travel over rural circuits can be avoided. The consumer is provided with a pad, each page of which is simply a meter reading slip together with a stub to be retained by the customer. The consumer reads the meter, fills out the slip and stub and remits the slip with his payment to the cooperative office. The disadvantage of this system lies in the fact that the slips are received folded in many ways and must be straightened out before filing. More important, whenever a late payment is made, the envelope must be saved in order to show the postmark date thereon, and these envelopes as received are of many sizes and shapes, and constitute an awkward filing problem.

The objects of this invention are to provide a billing book which will reduce labor at the central cooperative office, and which will increase the accuracy of the records kept by both the consumer and the billing office while at the same time being of convenient use.

In general these objects are obtained by constructing and providing each consumer with a book consisting of pages of which alternate pages are a combination pre-addressed envelope and billing slip, while the intermediate pages consist of the record to be retained by the consumer. After the consumer reads the meter, he simply fills out the billing slip, with a carbon copy immediately recorded on the intermediate page for the consumer's records, and then tears off the billing slip with its attached envelope, and after inserting his remittance, mails it to the central billing office. The central office thus is provided with a meter reading slip, on the back of which is stamped a postal cancellation date, which can be filed in a much more compact and orderly file than heretofore possible.

The means by which the objects of the invention are obtained are described more fully with reference to the accompanying drawings, in which:

Figure 2 is a plan view of the book with the cover removed, and envelope open;

Figure 3 is a partial plan view of the book with the upper billing slip turned over so as to expose the rear face thereof;

Figure 4 is a perspective view of the billing envelope as folded into mailing form;

Figure 5 is a cross-sectional view on the line 5—5 of Figure 4;

Figure 6 is a cross-sectional view on the line 6—6 of Figure 4;

Figure 7 is a perspective view of a modified form of the billing and recording book;

Figure 8 is a similar view with the cover lifted to show the envelope page;

Figure 9 is a similar view with the envelope page lifted to show a carbon sheet;

Figure 10 is a view of a portion of Figure 9 with the carbon page folded back to expose the consumer's record page;

Figure 11 is a plan view of Figure 8;

Figure 12 is a side view of Figure 11; and

Figure 13 is a perspective view of the envelope page folded for mailing.

Figure 1:
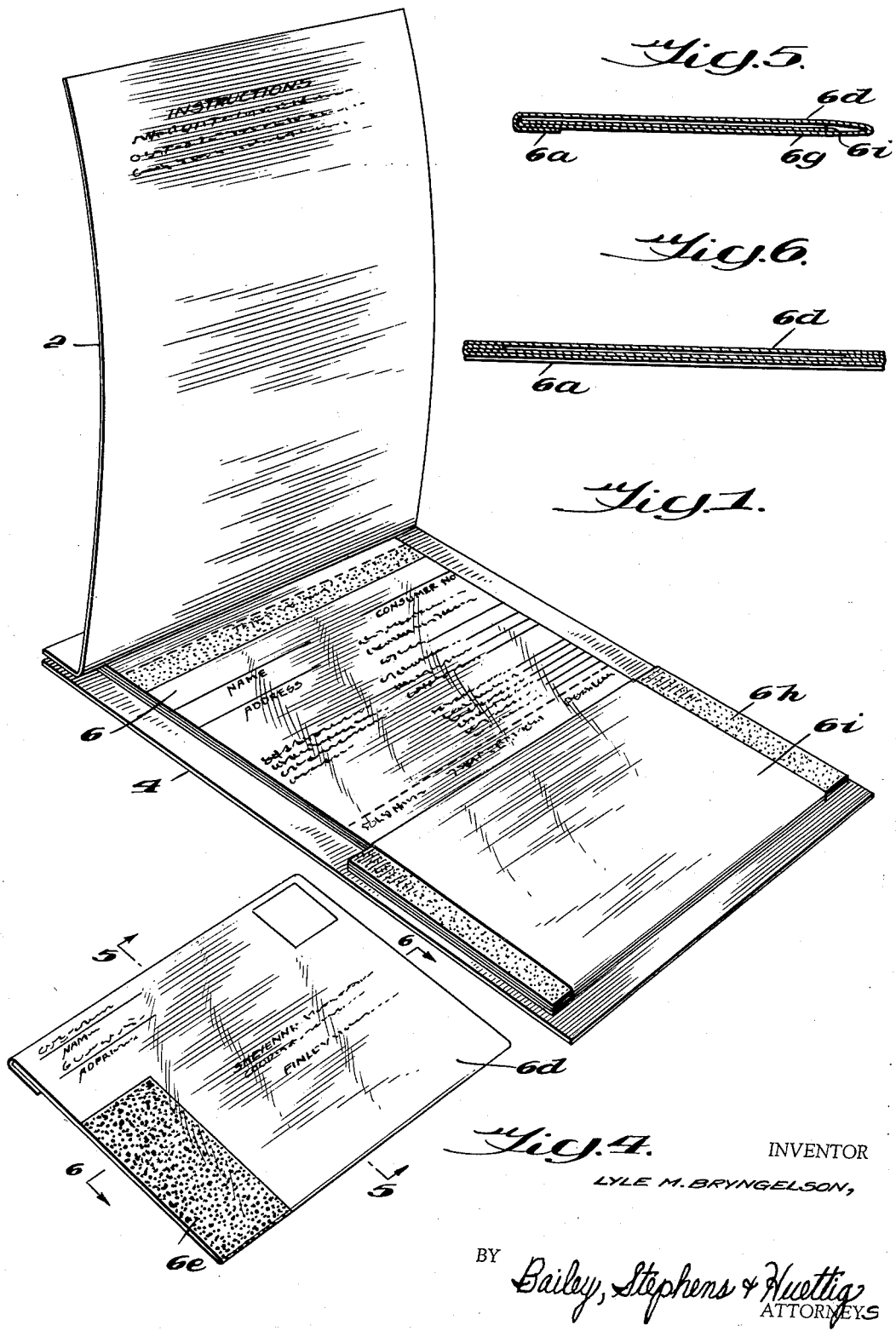
Figure 1 is a perspective view of the billing and recording book.

The book as presented to the consumer consists of a cover sheet 2, a bottom sheet 4, between which are enclosed a number of billing slip and envelope pages 6, and record pages 8. The inside of cover 2 contains instructions for the reading of the meter, and for making the remittance.

Each combined billing slip and envelope page is composed of an upper gummed flap area 6a separable from the book by a perforated tear line 6b, and delineated from the next area by a fold line 6c. The connecting area 6d constitutes a billing slip. As shown this slip contains lines for the consumer's name and address. In a single vertical column placed along the right-hand side are lines for indicating the consumer's number, the date, the meter readings, and the amounts owed for the various items charged for. This vertical column is particularly arranged in this fashion because on the opposite side of the slip, note Figure 3, a carbon deposit 6e is placed to cover this column so that when the information is recorded on area 6d, it will also be imprinted upon lower page 8, which is identically lined and lettered with area 6d. Below area 6d and separated therefrom by a fold line 6f, perforated for easy separation, is an envelope section which consists of a back portion 6g having gummed side flaps 6h and a bottom section 6i joined to section 6g by fold line 6j.

Section 6d, note Figure 3, has on its reverse side the pre-printed name and address of the central billing station, as well as a place for the name and address of the consumer.

The intermediate pages 8 are simply co-extensive with the area 6d of page 6, and are permanently bound in the book. These pages 8 constitute the permanent record for the consumer.

After the consumer has read his meter and filled in the information required on area 6d, as before stated, the consumer number, the date, the meter readings and the items of money due are all recorded by carbon copy on page 8. Thereupon the consumer separates page 6 from the pad by tearing along line 6b. Side 6i is then folded on line 6j to cover panel 6g, and flaps 6h folded over and pasted down to form an envelope. The remittance, in the form of cash or check from the consumer to the billing office, is inserted in this envelope, and the billing slip 6d folded on line 6f to cover flap 6i, a further fold being made on line 6c in order to seal the flap 6a against the face of panel 6g. When the envelope is so put together, billing slip 6d becomes a part thereof, and the address of the billing office, note Figures 3 and 4, appears on the outer face of the envelope.

When received in the central billing office, the uniform sized envelopes can be run through a letter opener to shear the envelope along the line 6c. The billing slip 6d is thus left intact with the envelope. The remittance is then removed and checked against the items entered in the lines on billing slip 6d, and if found to be correct, the billing slip is detached, on line 6f which is perforated and is ready for posting and filing. The billing slip 6d not only has the meter reading and amount paid on one side, but on the reverse side will have the consumer's name and the post office date showing whether or not the remittance was made before the penalty date. Consequently, the billing slips do not have to be separately stamped when they are received in the office, inasmuch as the postal cancellation date is taken as the remittance date. Furthermore, the billing slips retained are of uniform size and can be filed in compact uniform drawers, or can be micro-filmed at little expense.

A modified form of the billing book is shown in Figures 7 to 13, inclusive. The envelope page 10 and the consumer's record page 12 are formed in one piece, the page 12 being folded beneath page 10, as shown by the folded edge 14, Figure 12. Flap A is the sealing flap, having adhesive 10a applied thereto, and adapted to be folded on line B so as to extend around the bottom edge of the envelope 10g. This envelope is preformed and is attached to billing form panel 10d along tear line 10f.

The back cover 20 is rebent at 22 to form flap 24 extended so that it underlies consumer's page 12. A sheet of carbon paper 26 is secured to flap 24 and rebent so that its carbon face 28 overlies and is toward page 12, note Figures 9 and 10. Then information recorded on page 10 will be transmitted to page 12. Page 10 is then torn free along line 10a and the billing form panel 10d folded down on envelope 10g to expose the address side of panel 10d, and permits flap A to be sealed on the back side of the envelope, as shown in Figure 13. Back flap 24 is then shifted into position under the next underlying consumer's sheet 12. Thus, as described for Figures 1 to 6, the utility office obtains a billing form panel 10d having the billing information on one side, and a postal cancellation date stamp on the other side.

It is apparent that the advantages of the invention are manyfold. The consumer is provided with a billing slip plus an addressed envelope. When the consumer makes the entry on the billing slip, he makes exactly the same entry on his record slip, and the possibility of a copying error is avoided. When the billing office receives an envelope, which by virtue of the postal cancellation date shows the date of the remittance was made, the necessity of further stamping is avoided. The envelope can be opened without spilling the contents, and the remittance extracted and checked against the billing slip before the envelope is separated, and the checked billing slip sent on for posting and accounting. All the trouble of handling different sized envelopes, and saving those particular envelopes bearing passed penalty date postal cancellation marks is avoided, thus materially decreasing the amount of work necessary in the billing office.

While the invention has been described with particular reference to the rural electric business, the invention is not limited thereto, but may be used in servicing other businesses.

Having now described the means by which the objects of the invention are obtained,

I claim:

1. A billing book comprising a plurality of envelope pages alternated with record pages, each envelope page being superimposed above a record page, and being composed of a billing slip portion co-extensive with said record page and a preformed envelope body portion, said billing slip portion and record page having registering information lines whereby data written on said billing slip will be carbon copied on said record page, and said billing strip having a preprinted post address on the reverse face thereof, and being foldable onto said body portion as a closure flap to present said address on the face of the envelope.

2. A billing book as in claim 1, further comprising a gummed flap extending from said billing slip portion, and a perforated tear line along one edge of said flap.

3. A billing book as in claim 1, further comprising a perforated fold line between said billing slip and said body portion.

4. A billing book as in claim 1, further comprising each record page being continuous with and folded beneath the envelope page, and a perforated tear line on said envelope page adjacent to the fold line with said record page.

5. A billing book as in claim 4, further comprising a back cover for said book extended into a flap positioned over an envelope page and beneath an overlying record page, and a sheet of carbon paper attached to said flap and having its carboned face overlying and toward said record page.

References Cited in the file of this patent

UNITED STATES PATENTS

| | | |
|---|---|---|
| 460,472 | Hitt | Sept. 29, 1891 |
| 745,713 | Boughton | Dec. 1, 1903 |
| 1,164,612 | Hoskins | Dec. 14, 1915 |
| 1,260,935 | Moore | Mar. 26, 1918 |
| 1,269,610 | Kennedy | June 18, 1918 |
| 2,148,887 | Wanser | Feb. 28, 1939 |
| 2,661,224 | Gaber | Dec. 1, 1953 |